United States Patent [19]
Sasaki et al.

[11] Patent Number: 6,139,673
[45] Date of Patent: Oct. 31, 2000

[54] PROCESS FOR PRODUCING FRICTION MATERIAL

[75] Inventors: Yosuke Sasaki; Michinori Yanagi, both of Saitama, Japan

[73] Assignee: Akebono Brake Industry Co., Ltd., Tokyo, Japan

[21] Appl. No.: 09/159,613

[22] Filed: Sep. 24, 1998

[30] Foreign Application Priority Data

Sep. 25, 1997 [JP] Japan ................................. 9-260401
Sep. 25, 1997 [JP] Japan ................................. 9-260402

[51] Int. Cl.$^7$ ............................. F16D 69/02; B32B 31/00
[52] U.S. Cl. ..................... 156/242; 156/322; 156/245; 264/319; 264/320; 264/322
[58] Field of Search ..................... 156/242, 245, 156/322; 264/319, 320, 322; 188/251 A, 251 R; 192/107 M, 107 R; 29/458, 527.2, 527.4, 469.5, 447

[56] References Cited

U.S. PATENT DOCUMENTS

| | | |
|---|---|---|
| 4,050,619 | 9/1977 | Tarr . |
| 4,173,681 | 11/1979 | Durrieu et al. .................. 428/409 |
| 4,193,956 | 3/1980 | Kalnins .......................... 264/27 |
| 4,835,013 | 5/1989 | Heck et al. . |
| 4,968,468 | 11/1990 | Leinweber ....................... 264/113 |
| 5,221,401 | 6/1993 | Genise ......................... 156/245 X |
| 5,807,518 | 9/1998 | Menard et al. . |
| 5,809,627 | 9/1998 | Baldwin ........................... 29/458 |

FOREIGN PATENT DOCUMENTS

| | | |
|---|---|---|
| 0283463A | 9/1988 | European Pat. Off. . |
| 0751317A | 1/1997 | European Pat. Off. . |
| 2350512 | 12/1977 | France . |
| 4420593A | 12/1994 | Germany . |
| 6-229433 | 8/1994 | Japan . |
| WO95/26473 | 10/1995 | WIPO . |

OTHER PUBLICATIONS

English–language Abstract of JP 6–229433.

*Primary Examiner*—Jeff H. Aftergut
*Attorney, Agent, or Firm*—Finnegan, Henderson, Farabow, Garrett & Dunner, L.L.P.

[57] ABSTRACT

A process for producing a friction material is disclosed, which comprises integrally bonding a preform of a friction material molding compound by heat-forming to a metallic backing plate which has been formed into a given shape and has undergone degreasing and priming, said heat-forming being conducted after the backing plate has been preheated to a temperature about equal to the heat-forming temperature to be used. The process is effective in simplifying the temperature control conducted in the heat-forming step and in providing high-quality friction materials always having stable physical properties and performances.

17 Claims, 5 Drawing Sheets

PROCESS FOR PRODUCING FRICTION MATERIAL

BACKGROUND OF THE INVENTION

1. Field of the Invention

The present invention relates to a process for producing a friction material for use as a disc pad, a brake shoe, or the like in the brakes of various vehicles, industrial machines, etc.

2. Related Art

Friction materials such as disc pads, brake shoes, and the like for use in the brakes of various vehicles, industrial machines, etc. have conventionally been produced by bonding two members to each other.

Figure 10:
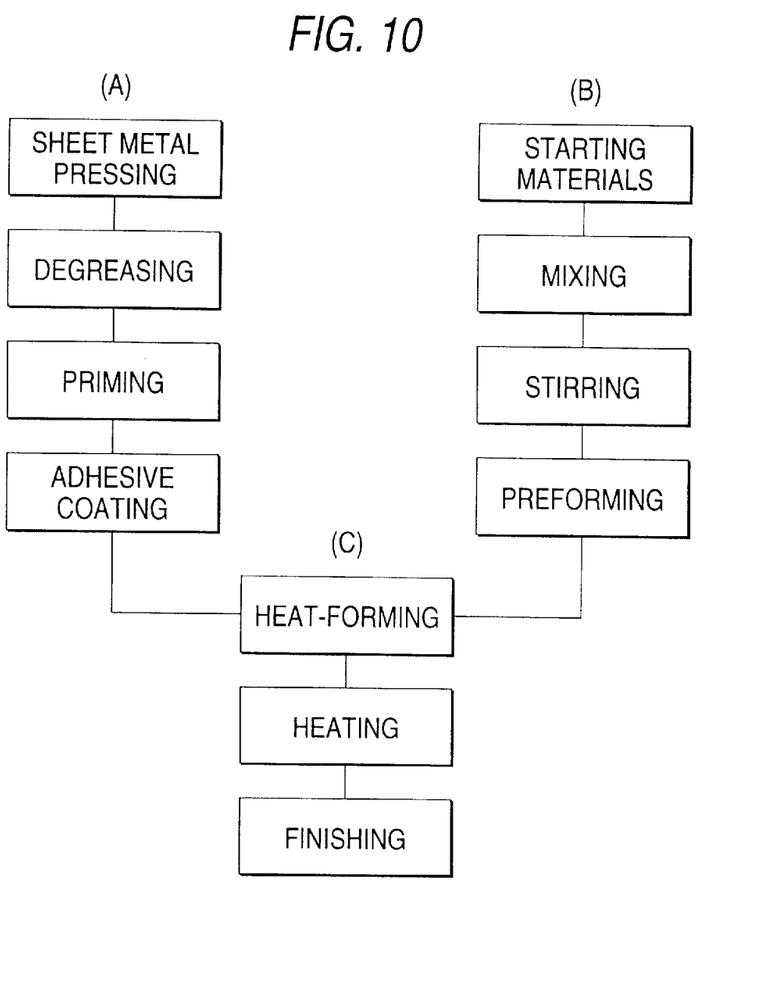
FIG. 10 is a flow chart showing steps for carrying out a conventional process for producing a friction material.

As shown in FIG. 10, a friction material is typically produced in the following manner. A metallic backing plate is produced which has been formed into a given shape by, e.g., sheet metal pressing and has undergone degreasing, priming, and coating with an adhesive (line (A)). Separately, a molding compound is prepared by mixing a fibrous reinforcement, e.g., heat-resistant organic fibers, inorganic fibers, or metallic fibers, with powdery starting materials comprising an inorganic/organic filler, a friction modifier, a thermosetting resin binder, etc., and sufficiently homogenizing the mixture by stirring, and then forming the molding compound at a room temperature and a given pressure to produce a preform (line (B)). The preform is heat-formed together with the metallic backing plate in a heat-forming step at a given temperature and pressure to integrally bond the two members to each other, and the integrated members are subjected to aftercuring and then final finishing to produce a friction material (line (C)).

In these conventional processes for producing friction materials, preforms and backing plates are produced in separate lines, as described above, and stored. Since the preforms and backing plates are generally stored at ambient temperature in factories or facilities, the temperature of the two kinds of members normally fluctuates with the ambient temperature of the storage place. Typically, the temperature of the stored members may fluctuate in the range of from 10 to 35° C. over a year.

In the heat-forming step, a preform and a backing plate are fitted to a heat-forming mold and maintained at a given temperature for a given period while applying a pressure thereto.

Under these circumstances, the backing plate and the preform may in summer have a temperature of around 35° C., which is the storage temperature when these members are fitted to a mold. On the other hand, these members can have a temperature of around 10° C. in winter. The heat energy necessary for heat-forming hence varies considerably from season to season. If the same heat-forming conditions for summer are used in winter, the preform and the backing plate are underheated, often resulting in separation between the two members. Conversely, if the same heat-forming conditions for winter are used in summer, the preform and the backing plate are excessively heated, so that the preform part tends to develop defects such as swelling, cracks, etc.

When friction materials are produced under heat-forming conditions that are changed seasonally, troublesome temperature control is necessary.

SUMMARY OF THE INVENTION

An object of the present invention is to simplify the temperature control conducted in a heat-forming step and to provide high-quality friction materials having stable physical properties and performances.

The above object is accomplished with a process for producing a friction material, according to the present invention, comprising a preform of a friction material molding compound bonded by heat-forming to a preheated metallic backing plate, which has been formed into a given shape and has undergone degreasing and priming, wherein the preheated metallic backing plate has been preheated to a temperature about equal to the heat-forming temperature to be used.

According to the above process for producing a friction material of the present invention, heat-forming can be conducted under constant temperature conditions, even when the ambient temperature varies, by preheating a primed metallic backing plate to a temperature about equal to the heat-forming temperature to be used. Hence, seasonal temperature control is unnecessary and friction materials having consistent qualities are obtained. Furthermore, the time required for the heat-forming step can be reduced. In addition, a reduction in production cost can also be attained, because the primer ingredient may function as an adhesive eliminating the necessity of applying an adhesive, as is done conventionally.

The present invention also includes a process for producing a friction material, which comprises preheating a metallic backing plate which has been formed into a given shape and has undergone degreasing and priming to a temperature about equal to the heat-forming temperature to be used, forming an adhesive layer on a preform of a friction material molding compound, and integrally bonding the preform to the preheated backing plate by heat-forming.

According to this process for producing a friction material of the present invention, heat-forming can be conducted under constant conditions, even when the storage temperature of the backing plate and friction material preform varies, by preheating a primed metallic backing plate, prior to the heat-forming step, to a temperature about equal to the heat-forming temperature to be used. Hence, seasonal temperature control is unnecessary and friction materials having constant quality are obtained. Furthermore, the time required for the heat-forming step can be reduced. Two embodiments of the present invention are described below. One embodiment does not employ an adhesive layer in heat-forming the primed metallic backing plate to the preform of friction material. The other embodiment forms an adhesive layer on the preform of friction material prior to its heat-forming to the primed metallic backing plate. The addition of the adhesive layer in the second embodiment helps form a tenacious bond between the preform of friction material and the primed metallic backing plate.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate two embodiments of the invention and together with the description serve to explain the principles of the invention.

DETAILED DESCRIPTION OF THE INVENTION

The process for producing a friction material by integrally bonding a preform of a friction material molding compound by heat-forming to a preheated metallic backing plate, which has been formed into a given shape and has undergone degreasing and priming, will be explained below.

Reference will now be made in detail to the present preferred embodiments of the invention, examples of which are illustrated in the accompanying drawings.

Figure 1:
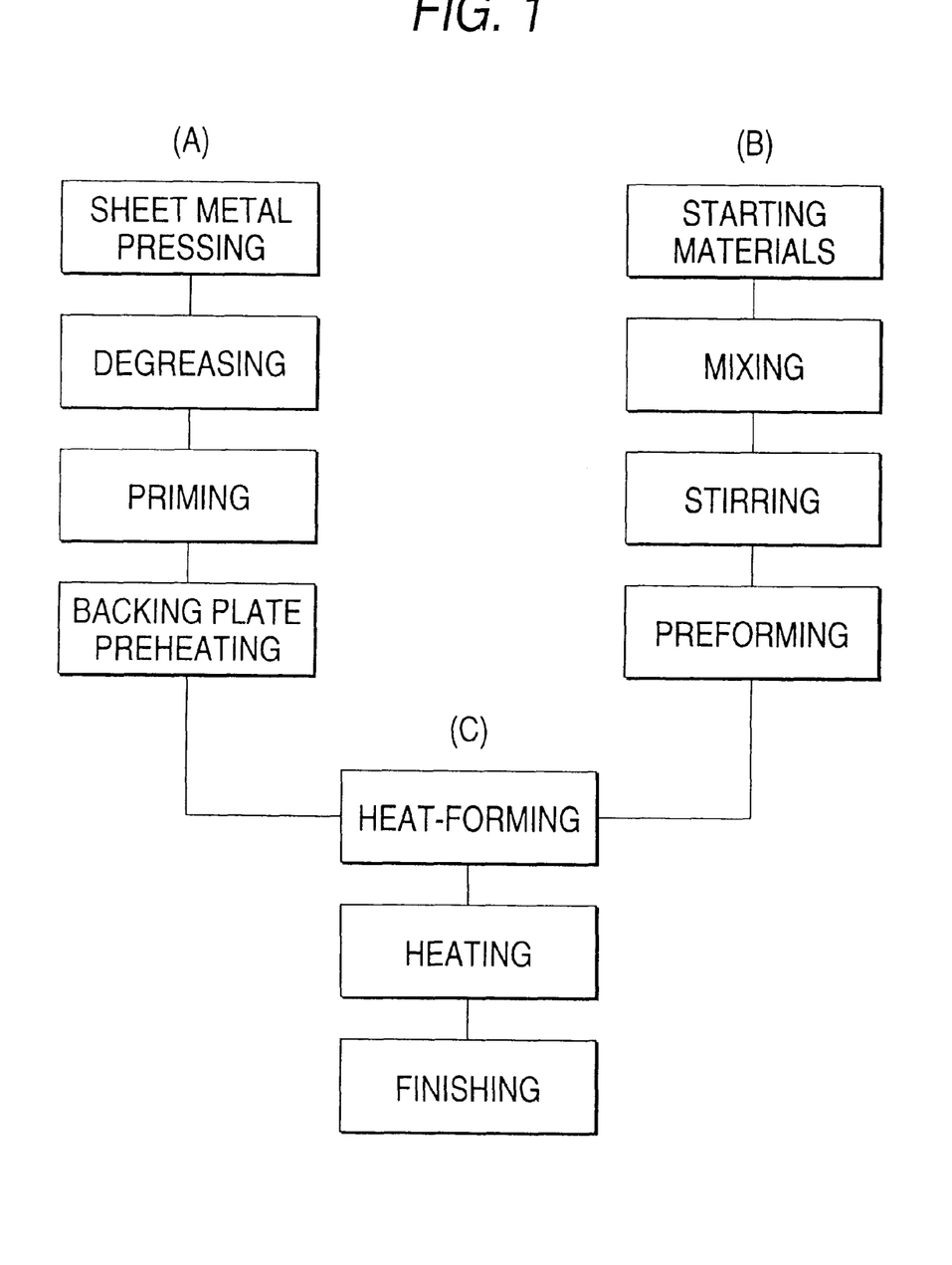
FIG. 1 is a flow chart showing steps for carrying out the first embodiment of the process for producing a friction material according to the present invention.

FIG. 1 is a flow chart illustrating one embodiment of the friction material production process of the present invention. This embodiment includes a backing plate processing line (A), a preforming line (B) for producing a friction material preform, and a heat-forming line (C) for producing a product from the processed members respectively obtained in the lines (A) and (B).

Each step will be explained below with respect to a disc brake pad as an example of the friction material.

The backing plate processing line (A) primarily includes the steps of sheet metal pressing, degreasing, priming, and backing plate preheating.

Figure 2:
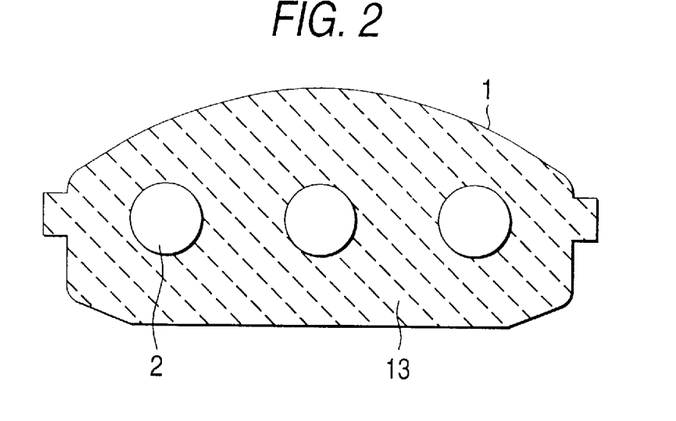
FIG. 2 is a plan view illustrating an example of a backing plate.

In the step of sheet metal pressing, a backing plate material selected beforehand is formed by pressing, or similar procedures to produce a backing plate 1 which, for example, has the nearly rectangular shape shown in FIG. 2 having openings 2 in given positions.

In the degreasing step, grease and other substances adhering to the backing plate 1 from the pressing are removed with a detergent.

In the priming step, a phenolic resin primer is applied to the degreased backing plate 1 over its whole surface as shown by broken lines in FIG. 2. The coating is dried and heated at about 180 to 200° C. for about 1 hour to cure the primer. Thus, a primer layer 3 is formed.

The embodiment shown in FIG. 1 is characterized by preheating the backing plate 1, which has already undergone the priming step, before sending the backing plate to the heat-forming line (C), which will be described later.

In the step of preheating the backing plate, the backing plate 1 having the primer layer 3 formed thereon is heated to a temperature of about the heat-forming temperature to be used, which may be, for example, 150 to 200° C. Methods for the preheating are not particularly limited. For example, use may be made of a method in which the primed backing plate 1 is placed in a microwave (or conventional) oven, or a method in which the primed backing plate 1 is placed on a hot plate.

According to this embodiment, the coating with an adhesive which is conducted in conventional processes is unnecessary (see FIG. 5), whereby the production cost can be reduced.

The preheated backing plate 1 is rapidly sent to the heat-forming step while keeping the plate 1 in its preheated state.

The preforming line (B) for producing a friction material preform primarily includes the steps of metering and mixing starting materials, stirring the mixture, and preforming the resultant molding compound. These steps can be conducted according to conventional techniques for friction material production.

For example, a fibrous reinforcement, such as heat-resistant organic fibers, inorganic fibers, or metallic fibers, powdery starting materials including an inorganic/organic filler, a friction modifier, a solid lubricant, and a thermosetting resin binder, are mixed in a given proportion. The resultant mixture is sufficiently homogenized by stirring to prepare a molding compound.

Examples of the organic filler include synthetic rubber particles and cashew dusts. Examples of the inorganic filler include particles of a metal such as copper, aluminum, or zinc, flaky inorganic substances such as vermiculite and mica, and particles of barium sulfate or calcium carbonate. Examples of the organic fibers include aromatic polyamide fibers and flameproofed acrylic fibers. Examples of the inorganic fibers include ceramic fibers such as potassium titanate fibers and alumina fibers, glass fibers, carbon fibers, and rock wool. Examples of the metallic fibers include copper fibers and steel fibers.

Examples of the thermosetting resin binder include phenolic resins (including straight phenolic resins and various modified phenolic resins, e.g., rubber-modified ones), melamine resins, epoxy resins, and cyanic ester resins.

Examples of the friction modifier include metal oxides such as alumina, silica, and zirconia. Examples of the solid lubricant include graphite and molybdenum disulfide.

Figure 3:
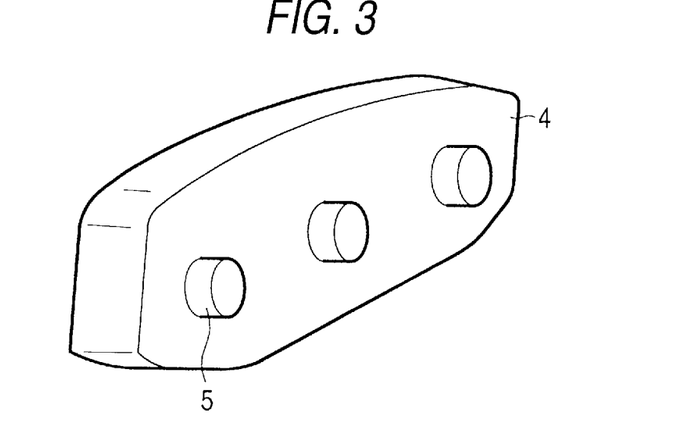
FIG. 3 is a perspective view illustrating an example of a preform for a friction material.

Subsequently, the molding compound is molded in a mold at a room temperatures and a pressure of about from 100 to 500 $kgf/cm^2$ to produce a preform 4 which, for example, may have the shape shown in FIG. 3. In FIG. 3, numeral 5 denotes a projection to be fitted into one of the openings 2 of the backing plate 1 shown in FIG. 1.

The backing plate 1 and the friction material preform 4 that have been treated or produced by the method described above are subsequently sent to the heat-forming line (C). This heat-forming line primarily includes a heat-forming step, a heating step, and a finishing step.

In the heat-forming step, the preheated backing plate 1, heated to a temperature of from 150 to 200° C. is first set in a hot press while keeping the plate 1 in its preheated state. The preform 4 is then placed thereon. The resultant assemblage was maintained at a heat-forming temperature, which, for example, may be about from 150 to 200° C., and a given pressure for a given period to thereby heat-cure the preform 4 and, simultaneously therewith, integrally bond the preform 4 to the backing plate 1 without using an adhesive.

According to the present invention, heat-forming is completed in a short time period because the backing plate 1 used for the heat-forming is in a preheated state. Hence, a considerable time reduction is attained in the heat-forming step.

Figure 4:
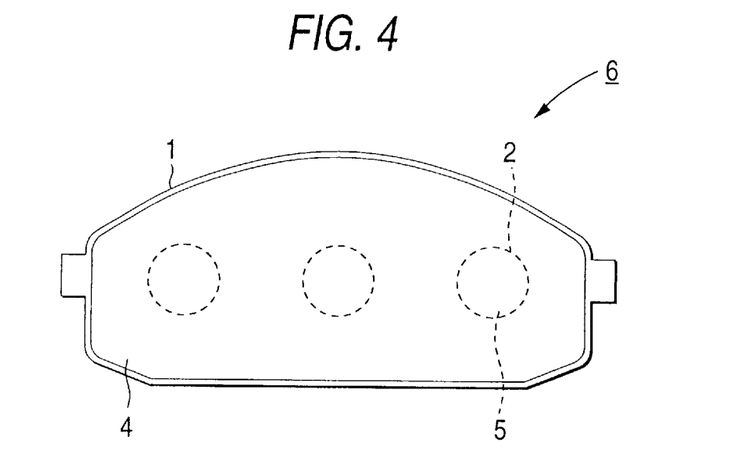
FIG. 4 is a plan view illustrating the backing plate and the friction material preform which have been integrated with each other.

Thereafter, the integrated members are postcured in the heating step and then finished in the finishing step in conventional manners to complete a disc pad 6 shown in FIG. 4.

The quantity of heat required in the heat-forming step for producing one automotive disc pad (backing plate/asbestos-free friction material) in each of summer and winter was calculated for both this embodiment of the present invention, and a conventional process for making a friction material. Specifically, unlike the conventional process for making friction material, the present invention requires preheating the metallic backing plate prior to heat-forming the preform of friction material molding compound to it. The results of the calculations are shown below. For the calculations, the ambient temperatures in summer and winter were regarded as 35° C. and 10° C., respectively, the weight and specific heat of the backing plate were taken as 240 g and 0.45 J/kg, respectively, and the weight and specific heat of the friction material were taken as 120 g and 0.7 J/kg, respectively.

The results of the calculations are shown in Table 1.

TABLE 1 unit: joule (J)

|  | With backing plate preheating | | Without backing plate preheating | |
| --- | --- | --- | --- | --- |
|  | Ambient temperature, 35° C. (summer) | Ambient temperature, 10° C. (winter) | Ambient temperature, 35° C. (summer) | Ambient temperature, 10° C. (winter) |
| (1) Backing plate (J) | 0 | 0 | 12 | 15 |
| (2) Friction material (J) | 10 | 12 | 10 | 12 |
| Total ((1) + (2)) (J) | 10 (3) | 12 (4) | 22 (5) | 27 (6) |
| Comparison in Quantity of heat with "without backing plate heating" | 45% ((3)/(5)) | 44% ((4)/(6)) | — | — |
| Difference in quantity of heat between summer and winter (J) | 2 ((4) − (3)) | | 5 ((6) − (5)) | |

Table 1 shows that the difference in the quantity of required heat between summer and winter was 2 J in this embodiment of the present invention, in which the backing plate was preheated, but was as large as 5 J in the case where the preheating was omitted. These results show that in this embodiment of the present invention, more stable production is possible throughout the year.

Moreover, by preheating the metallic backing plate, a reduction in energy required to heat form the friction material was achieved. The reduction in energy required was 45% and 44% in summer and winter, respectively.

Accordingly, the time required for the heat-forming step was 10 minutes in the case where backing plate preheating was omitted. In contrast, in this embodiment of the present invention, in which the backing plate was preheated, a sufficient bonding strength between the backing plate and the friction material preform was obtained through about 7-minute heat-forming. It was thus ascertained that a reduction in heat-forming time was achieved.

Figure 5:
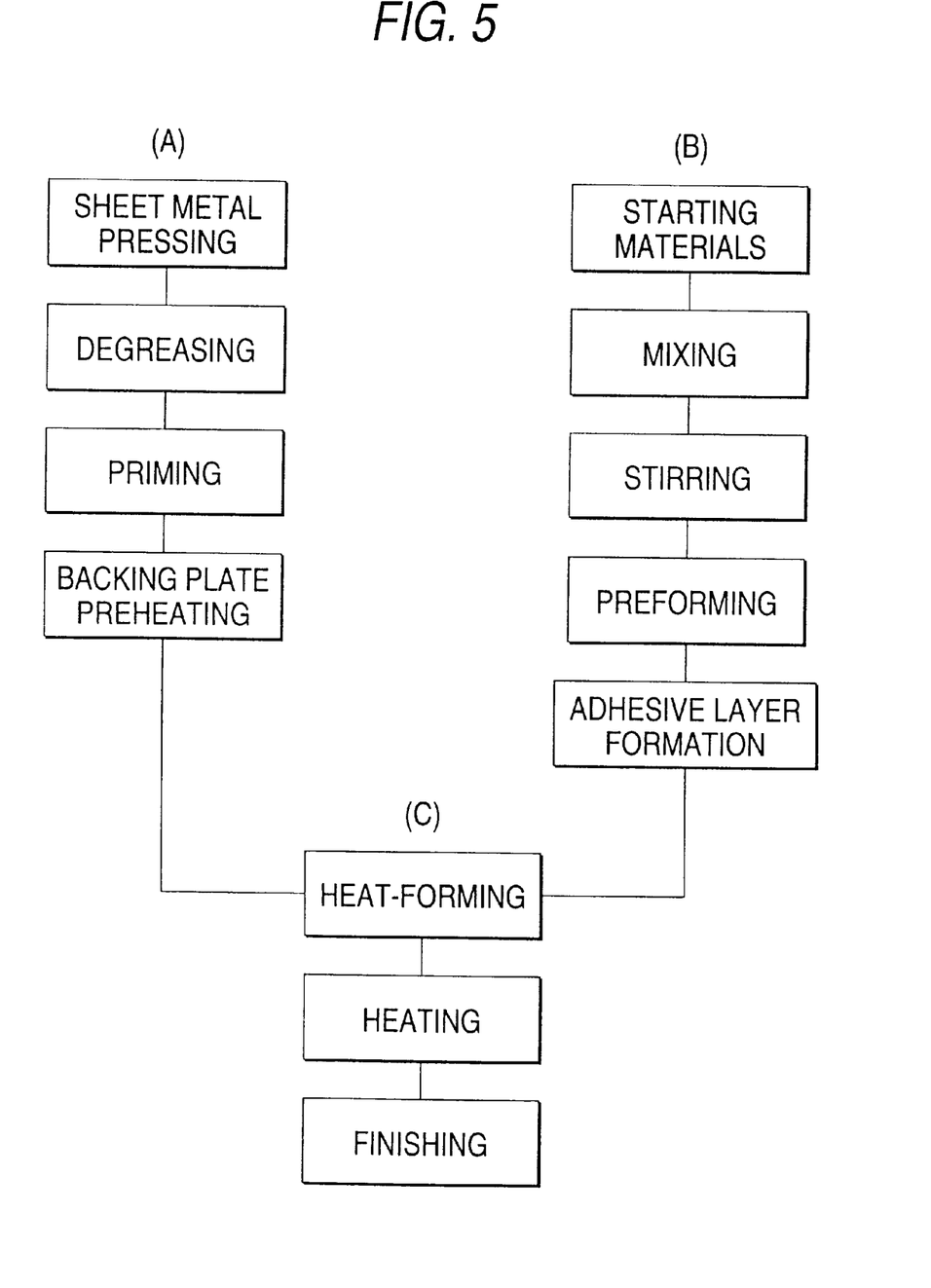
FIG. 5 is a flow chart showing steps for carrying out the second embodiment of the process for producing a friction material according to the present invention.

FIG. 5 is a flow chart illustrating the second embodiment of the friction material production process of the present invention. Like the first embodiment, this embodiment involves a backing plate processing line (A), a preforming line (B) for producing a friction material preform, and a heat-forming line (C) for producing a product from the processed members respectively obtained in the lines (A) and (B).

Each step will be explained below with respect to a disc brake pad as an example of the friction material, as in the case of the first embodiment.

The backing plate processing line (A) primarily includes the steps of sheet metal pressing, degreasing, priming, and backing plate preheating.

Figure 6:
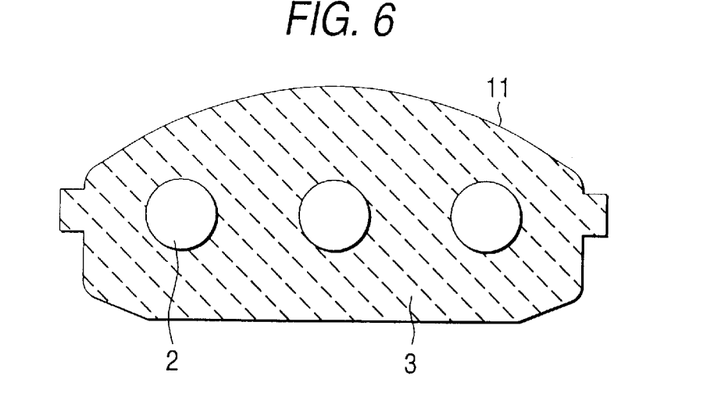
FIG. 6 is a plan view illustrating an example of a backing plate.

In the step of sheet metal pressing, a backing plate material selected beforehand is formed by pressing, etc. to produce a backing plate 11 which, for example, may have the nearly rectangular shape shown in FIG. 6 having openings 12 in given positions.

In the degreasing step, the grease and other substances that adhered to the backing plate 11 in the pressing are removed with a detergent.

In the priming step, a phenolic resin primer is applied to the degreased backing plate 11 over its whole surface shown by broken lines in FIG. 6. The coating is dried and heated at about 180 to 200° C. for about 1 hour to cure the primer. Thus, a primer layer 13 is formed.

This embodiment is characterized in that the backing plate 11 which has undergone the priming step is preheated before being sent to the heat-forming line (C), which will be described later.

In this step of backing plate preheating, the backing plate 11 having the primer layer 13 formed thereon is heated to a temperature of about from 150 to 200° C., which is about equal to the heat-forming temperature to be used. Since the heat-forming temperature varies depending on the kind of the friction material preform described below, the temperature at which the backing plate 11 is heated in this step of backing plate preheating is suitably selected accordingly from the range about from 150 to 200° C. As a result of this preheating, the backing plate 11 comes to have a temperature about equal to the heat-forming temperature to be used, which, for example, may be about from 150 to 200° C. Methods for the heating are not particularly limited. For example, use may be made of a method in which the primed backing plate 11 is placed in a microwave (or conventional) oven, or a method in which the primed backing plate 11 is placed on a hot plate.

The preheated backing plate 11 is rapidly sent to the heat-forming step while maintaining its temperature about equal to the heat-forming temperature.

The preforming line (B) for producing a friction material preform primarily includes the steps of metering and mixing starting materials, stirring the mixture, preforming the resultant molding compound, and coating with an adhesive.

In this preforming line (B), a molding compound is first prepared, for example, in the following manner. A fibrous reinforcement, such as heat-resistant organic fibers, inorganic fibers, or metallic fibers, powdery starting materials including. an inorganic/organic filler, a friction modifier, a solid lubricant, and a thermosetting resin binder, are mixed in a given proportion The resultant mixture is sufficiently homogenized by stirring to prepare a molding compound.

Examples of the organic filler include synthetic rubber particles and cashew dusts. Examples of the inorganic filler include particles of a metal such as copper, aluminum, or zinc, flaky inorganic substances such as vermiculite and mica, and particles of barium sulfate or calcium carbonate. Examples of the organic fibers include aromatic polyamide fibers and flameproofed acrylic fibers. Examples of the inorganic fibers include ceramic fibers such as potassium titanate fibers and alumina fibers, glass fibers, carbon fibers, and rock wool. Examples of the metallic fibers include copper fibers and steel fibers.

Examples of the thermosetting resin binder include phenolic resins (including straight phenolic resins and various modified phenolic resins, e.g., rubber-modified ones), melamine resins, epoxy resins, and cyanic ester resins.

Examples of the friction modifier include metal oxides such as alumina, silica, and zirconia. Examples of the solid lubricant include graphite and molybdenum disulfide.

Figure 7:
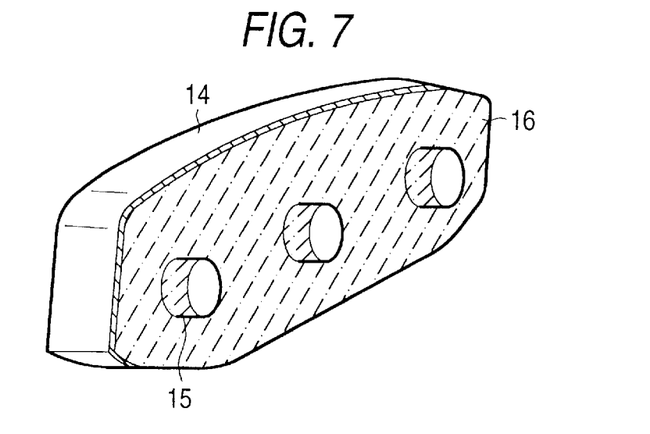
FIG. 7 is a perspective view illustrating an example of a preform for a friction material.

Subsequently, the molding compound is molded in a mold at a room temperature and a pressure of about from 100 to 500 kgf/cm$^2$ to produce a preform 14 which, for example, may have the shape shown in FIG. 7. In FIG. 7, numeral 15 denotes a projection to be fitted into one of the openings 12 of the backing plate 11 shown in FIG. 6.

An adhesive layer 16 is formed on the preform 14 on the side having the projections 15. In a conventional process, an adhesive is applied to a backing plate 11 as shown in FIG. 10. In the present invention, however, an adhesive is applied not to the backing plate 11 but rather to the preform 14 to form an adhesive layer 16 thereon, because the backing plate 11 has been preheated as described above.

For forming the adhesive layer 16, a conventional adhesive in a powder or sheet form may be used.

The backing plate 11 and the friction material preform 14 which have been treated or produced by the method described above are subsequently sent to the heat-forming line (C). This heat-forming line primarily includes a heat-forming step, a heating step, and a finishing step.

In the heat-forming step, the preheated backing plate 11 heated to a temperature of about from 150 to 200° C. is first set in a hot press while maintaining its temperature about equal to a heat-forming temperature. The preform 14 is then placed thereon.

Subsequently, the resultant assemblage was maintained at a heat-forming temperature, which, for example, may be about from 150 to 200° C., and a given pressure (200 to 1,000 kgf/cm$^2$) for a given period (3 to 15 minutes) to thereby heat-form the preform 14 and, simultaneously integrally bond the preform 14 to the backing plate 11.

According to this embodiment, the assemblage can be heated to the heat-forming temperature in a short time period because the backing plate 11 used for the heat-forming has been preheated to a temperature about equal to the heat-forming temperature. Hence, a considerable time reduction is attained in the whole heat-forming step.

Figure 8:
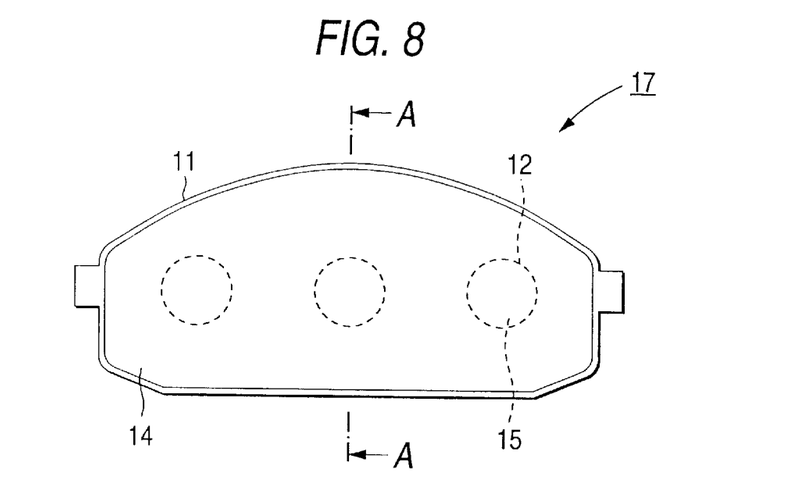
FIG. 8 is a plan view illustrating the backing plate and the friction material preform which have been integrated with each other.

Thereafter, the integrated members are aftercured in the heating step and then finished in the finishing step in conventional manners to complete a disc pad 17 shown in FIG. 8.

Figure 9:
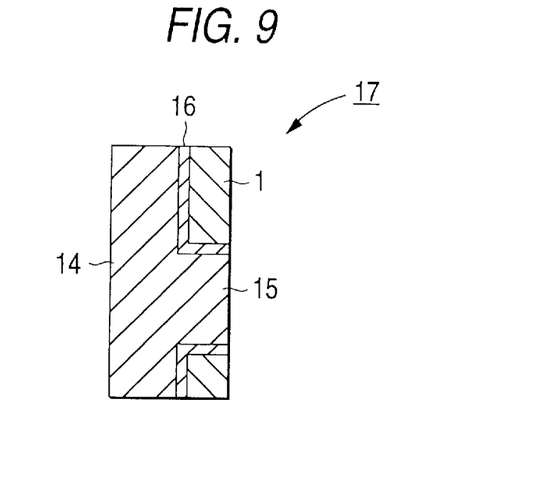
FIG. 9 is a sectional view taken on the line A—A in FIG. 8.

As shown in its sectional view given in FIG. 9, this disc pad 17 is constituted of the backing plate 11 and the preform 14, which have been bonded to each other with the adhesive layer 16 formed on the preform 14.

The quantity of heat required for producing one automotive disc pad (backing plate/asbestos-free friction material) in both summer and winter was calculated with respect to this embodiment of the process for friction material production according to the present invention. The calculation results obtained were the same as those for the first embodiment.

As explained above, according to the present invention, friction material products of constant quality can be produced stably throughout the year at a wide range of ambient temperatures without the necessity of seasonal temperature control in the heat-forming step. A reduction in the time required for the heat-forming step can also be attained. In the first embodiment, there is no need of using an adhesive, unlike conventional processes, so a reduction in production cost can be attained. Furthermore, in the second embodiment, a friction material in which a backing plate and a preform have been tenaciously bonded to each other is obtained since the preform has been coated with an adhesive.

It will be apparent to those skilled in the art that various modifications and variations can be made in the process for producing a friction material of the present invention without departing from the spirit and scope of the invention. Thus, it is intended that the present invention cover the modifications and variations of this invention provided they come within the scope of the appended claims and their equivalents.

What is claimed is:

1. A process for producing a friction material comprising a preform of a friction material molding compound bonded by heat-forming to a preheated metallic backing plate that has been formed into a given shape and has undergone degreasing and priming, wherein said backing plate is preheated to a temperature about equal to said heat-forming temperature to be used.

2. A process for producing a friction material comprising a preform of friction material molding compound having a layer of adhesive adhered thereto, heat-formed to bond to a preheated metallic backing plate that has been formed into a given shape, degreased, and primed, wherein said preheated metallic backing plate has been preheated to a temperature about equal to said heat-forming temperature to be used.

3. A process for producing a friction material according to claim 1, wherein said priming step comprises applying a phenolic resin primer to the degreased metallic backing plate, and drying and heating the phenolic resin primer.

4. A process for producing a friction material according to claim 3, wherein said phenolic resin primer is dried and heated at 180 to 200° C. for about 1 hour.

5. A process for producing a friction material according to claim 1, wherein said backing plate temperature is preheated to about from 150 to 200° C.

6. A process for producing a friction material according to claim 1, wherein said preform is produced by steps comprising mixing starting materials, stirring the mixture, and preforming the resultant molding compound into said preform.

7. A process for producing a friction material according to claim 6, wherein said starting materials include a fibrous reinforcement, a filler, a friction modifier, a solid lubricant, and a thermosetting resin binder.

8. A process for producing a friction material according to claim 7, wherein said fibrous reinforcement is selected from the group consisting of heat-resistant organic fibers, inorganic fibers, and metallic fibers, or mixtures thereof; wherein said filler is selected from the group consisting of synthetic rubbers, cashew resins, copper, aluminum, zinc, flake-like inorganic substances, barium sulfate, and calcium carbonate, or mixtures thereof; wherein said heat-resistant organic fibers are selected from the group consisting of aromatic polyamide fibers and flameproofed acrylic fibers, or mixtures thereof; wherein said inorganic fibers are selected from the group consisting of ceramic fibers, carbon fibers, and steel wool, or mixtures thereof; wherein said metallic fibers are copper fibers, steel fibers, or mixtures thereof; wherein said thermosetting resin binder is selected from the group consisting of phenolic resins, melamine resins, epoxy resins, and cyanic ester resins, or mixtures thereof; wherein said friction modifier is comprised of metal oxides; and, wherein said solid lubricant is selected from the group consisting of graphite and molybdenum disulfide, or mixtures thereof.

9. A process for producing a friction material according to claim 1, wherein said preform of a friction material molding compound is molded at a pressure of about 100 to 500 kgf/cm$^2$, and wherein said heat-forming occurs at a temperature of about from 150 to 200° C.

10. A process for producing a friction material according to claim 2, wherein said adhesive layer is in a powder or sheet form.

11. A process for producing a friction material according to claim 2, wherein said priming step comprises applying a phenolic resin primer to the degreased metallic backing plate, and drying and heating the phenolic resin primer.

12. A process for producing a friction material according to claim 11, wherein said phenolic resin primer is dried and heated at 180 to 200° C. for about 1 hour.

13. A process for producing a friction material according to claim 2, wherein said backing plate temperature is pre-heated to about from 150 to 200° C.

14. A process for producing a friction material according to claim 2, wherein said preform of a friction material is produced by steps comprising mixing starting materials, stirring the mixture, and preforming the resultant molding compound.

15. A process for producing a friction material according to claim 14, wherein said starting materials include a fibrous reinforcement, a filler, a friction modifier, a solid lubricant, and a thermosetting resin binder.

16. A process for producing a friction material according to claim 15, wherein said fibrous reinforcement is selected from the group consisting of heat-resistant organic fibers, inorganic fibers, and metallic fibers, or mixtures thereof; wherein said filler is selected from the group consisting of synthetic rubbers, cashew resins, copper, aluminum, zinc, flake-like inorganic substances, barium sulfate, and calcium carbonate, or mixtures thereof; wherein said heat-resistant organic fibers are selected from the group consisting of aromatic polyamide fibers and flameproofed acrylic fibers, or mixtures thereof; wherein said inorganic fibers are selected from the group consisting of ceramic fibers, carbon fibers, and steel wool, or mixtures thereof; wherein said metallic fibers are copper fibers, steel fibers, or mixtures thereof; wherein said thermosetting resin binder is selected from the group consisting of phenolic resins, melamine resins, epoxy resins, and cyanic ester resins, or mixtures thereof; wherein said friction modifier is comprised of metal oxides; and, wherein said solid lubricant is selected from the group consisting of graphite and molybdenum disulfide, or mixtures thereof.

17. A process for producing a friction material according to claim 2, wherein said preform of a friction material molding compound is molded at a pressure of about 100 to 500 kgf/cm$^2$, and wherein said heat-forming occurs at a temperature of about from 150 to 200° C.

\* \* \* \* \*